US010049107B2

(12) United States Patent
Otsuka

(10) Patent No.: US 10,049,107 B2
(45) Date of Patent: Aug. 14, 2018

(54) NON-TRANSITORY COMPUTER READABLE MEDIUM AND INFORMATION PROCESSING APPARATUS AND METHOD

(71) Applicant: FUJI XEROX CO., LTD., Tokyo (JP)

(72) Inventor: Toru Otsuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/203,406

(22) Filed: Jul. 6, 2016

(65) Prior Publication Data
US 2017/0249299 A1 Aug. 31, 2017

(30) Foreign Application Priority Data

Feb. 25, 2016 (JP) ................................ 2016-034242

(51) Int. Cl.
| G06F 17/00 | (2006.01) |
| G06F 17/28 | (2006.01) |
| G06F 17/30 | (2006.01) |
| G06F 3/0482 | (2013.01) |
| G06F 3/0484 | (2013.01) |
| G06F 17/24 | (2006.01) |
| G06K 9/00 | (2006.01) |
| G06K 9/34 | (2006.01) |

(52) U.S. Cl.
CPC .......... *G06F 17/289* (2013.01); *G06F 3/0482* (2013.01); *G06F 3/04847* (2013.01); *G06F 17/24* (2013.01); *G06F 17/30247* (2013.01); *G06K 9/00463* (2013.01); *G06K 9/344* (2013.01); *G06K 2209/01* (2013.01)

(58) Field of Classification Search
CPC ................................................ G06F 17/30247
See application file for complete search history.

(56) References Cited

U.S. PATENT DOCUMENTS

| 5,003,499 | A | * | 3/1991 | Fujiwara | .................. G06T 11/60 |
| | | | | | 715/246 |
| 5,784,487 | A | * | 7/1998 | Cooperman | ....... G06K 9/00469 |
| | | | | | 382/112 |
| 6,043,823 | A | * | 3/2000 | Kodaira | ............. G06K 9/00469 |
| | | | | | 345/619 |
| 7,054,803 | B2 | * | 5/2006 | Eisele | .................. G06F 17/2827 |
| | | | | | 704/2 |
| 7,735,004 | B2 | * | 6/2010 | Kobashi | ................ G06F 17/211 |
| | | | | | 715/201 |
| 7,966,352 | B2 | * | 6/2011 | Madan | .................. G06F 17/242 |
| | | | | | 345/173 |
| 9,501,554 | B2 | * | 11/2016 | Chiba | ............... G06F 17/30247 |
| 9,514,127 | B2 | * | 12/2016 | Katsuno | ............. G06F 17/3005 |

(Continued)

FOREIGN PATENT DOCUMENTS

JP 2006-127270 A 5/2006

*Primary Examiner* — Laurie A Ries
(74) *Attorney, Agent, or Firm* — Oliff PLC

(57) ABSTRACT

A non-transitory computer readable medium storing a translation program causes a computer to execute a process. The process includes: displaying image information, text regions, and original text in association with each other, the text regions being obtained by extracting regions including an image of text from the image information, the original text being obtained by performing character recognition on the text included in the text regions; and editing the text regions in accordance with the content of a received operation.

17 Claims, 20 Drawing Sheets

(56) References Cited

U.S. PATENT DOCUMENTS

| | | | | |
|---|---|---|---|---|
| 2002/0118379 A1* | 8/2002 | Chakraborty | ....... | G06F 17/2241 358/1.9 |
| 2004/0205568 A1* | 10/2004 | Breuel | ................... | G06F 17/211 715/205 |
| 2005/0195221 A1* | 9/2005 | Berger | ................... | G06F 3/0481 345/660 |
| 2005/0195436 A1* | 9/2005 | Tanaka | ................... | G06F 3/1208 358/1.18 |
| 2007/0171473 A1* | 7/2007 | Iwasaki | ............. | G06F 17/30011 358/1.18 |
| 2011/0123115 A1* | 5/2011 | Lee | ......................... | G06K 9/036 382/185 |
| 2012/0042240 A1* | 2/2012 | Oliveira | ................. | G06F 17/212 715/243 |
| 2012/0127192 A1* | 5/2012 | Cheong | .................... | G09G 5/14 345/589 |
| 2013/0011055 A1* | 1/2013 | You | ..................... | G06K 9/00973 382/165 |
| 2013/0326341 A1* | 12/2013 | Nonaka | ................... | G06T 11/60 715/246 |
| 2014/0078559 A1* | 3/2014 | Wu | ........................... | G06K 9/00 358/452 |
| 2014/0270549 A1* | 9/2014 | Vincent | ................ | G06K 9/3258 382/224 |
| 2015/0199314 A1* | 7/2015 | Ratnakar | ................. | G06F 17/24 715/255 |
| 2016/0110331 A1* | 4/2016 | Horiuchi | ................. | G06F 17/24 715/271 |
| 2017/0139921 A1* | 5/2017 | Ball | ..................... | G06F 17/3053 |
| 2017/0249299 A1* | 8/2017 | Otsuka | ................... | G06F 3/0482 |
| 2018/0011824 A1* | 1/2018 | Goldstein | ............ | G06F 17/2211 |

\* cited by examiner

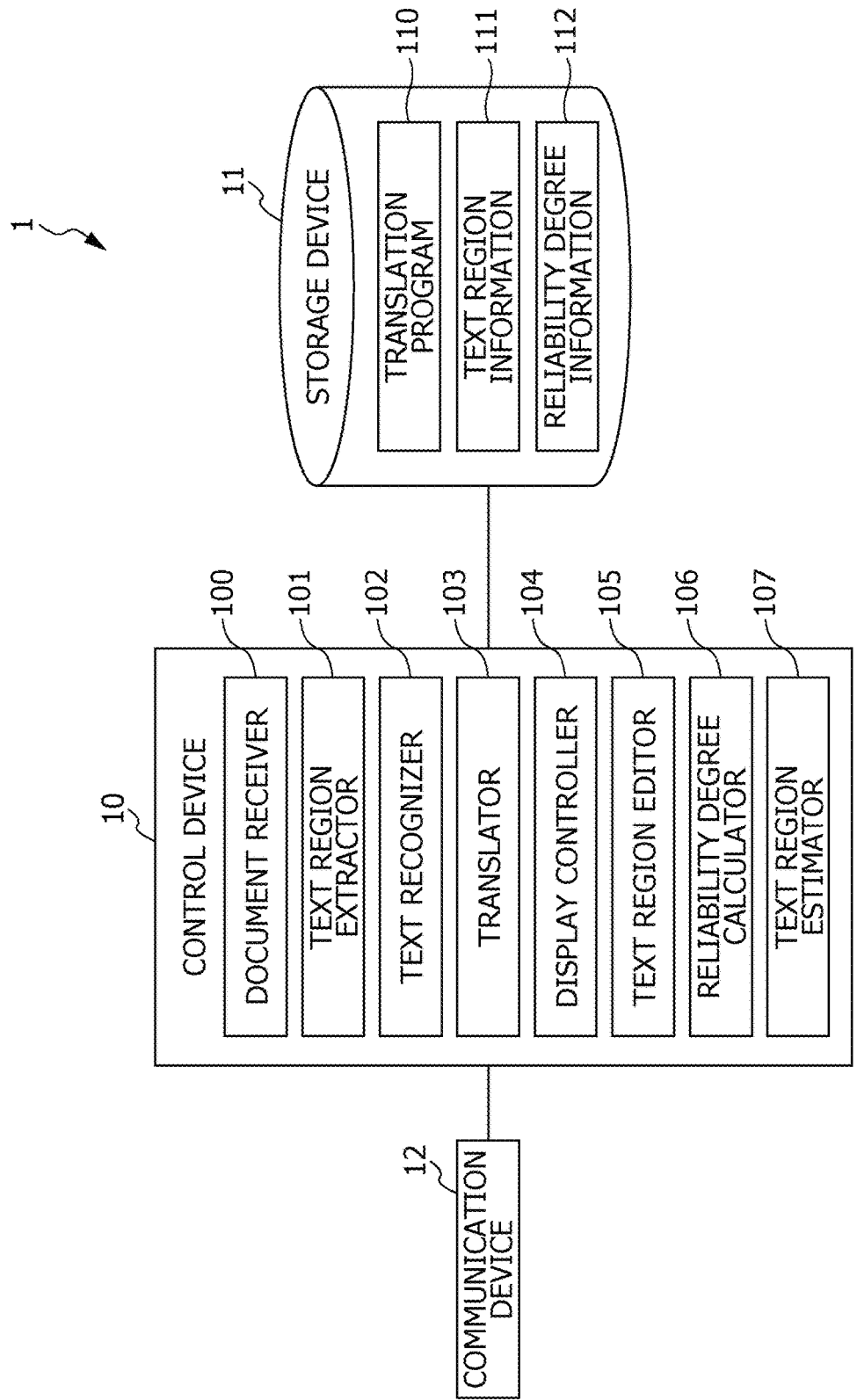

FIG. 2

| DOCUMENT TRANSLATION | | | | |
|---|---|---|---|---|
| SOURCE LANGUAGE: | ◉ JAPANESE | ◉ ENGLISH | ◉ CHINESE (TRADITIONAL) | ◉ CHINESE (SIMPLIFIED) | ◉ KOREAN |
| | ◉ THAI | ◉ VIETNAMESE | ◉ INDONESIAN | ◉ MALAY | |
| TARGET LANGUAGE: | ☐ JAPANESE | ☐ ENGLISH | ☐ CHINESE (TRADITIONAL) | ☐ CHINESE (SIMPLIFIED) | ☐ KOREAN |
| | ☐ THAI | ☐ VIETNAMESE | ☐ INDONESIAN | ☐ MALAY | |
| DOCUMENT TO BE TRANSLATED: | | | [SELECT] | |
| PAGE TO BE TRANSLATED: | ● ALL | ○ SPECIFY PAGE | | |
| | | [EXECUTE] | [CANCEL] | |

| ORIGINAL TEXT | COORDINATES | WIDTH | HEIGHT | IMAGE |
|---|---|---|---|---|
| 5. | 55 , 8 | 5 | 14 | 5. |
| C | 60 , 10 | 6 | 12 | C |
| o | 65 , 12 | 4 | 8 | o |
| r | 70 , 10 | 3 | 12 | r |
| ⋮ | ⋮ | ⋮ | ⋮ | ⋮ |

| ORIGINAL | RELIABILITY DEGREE |
|---|---|
| C | 0 (NOT INCLUDED IN DICTIONARY) |
| o | 0 (NOT INCLUDED IN DICTIONARY) |
| r | 0 (NOT INCLUDED IN DICTIONARY) |
| r | 0 (NOT INCLUDED IN DICTIONARY) |
| e | 0 (NOT INCLUDED IN DICTIONARY) |
| l | 0 (NOT INCLUDED IN DICTIONARY) |
| a | 0 (NOT INCLUDED IN DICTIONARY) |
| t | 0 (NOT INCLUDED IN DICTIONARY) |
| i | 0 (NOT INCLUDED IN DICTIONARY) |
| o | 0 (NOT INCLUDED IN DICTIONARY) |
| n | 0 (NOT INCLUDED IN DICTIONARY) |
| diagram of seller and buyer | 100 |
| Key Issue | 100 |
| Strength Knowledge of Products and Know-how | 50 (NOT GRAMMATICALLY CORRECT) |
| environment | 100 |
| Strengthen online sales | 100 |
| Using its high | 40 (NOT GRAMMATICALLY CORRECT) |
| technology | 100 |

112

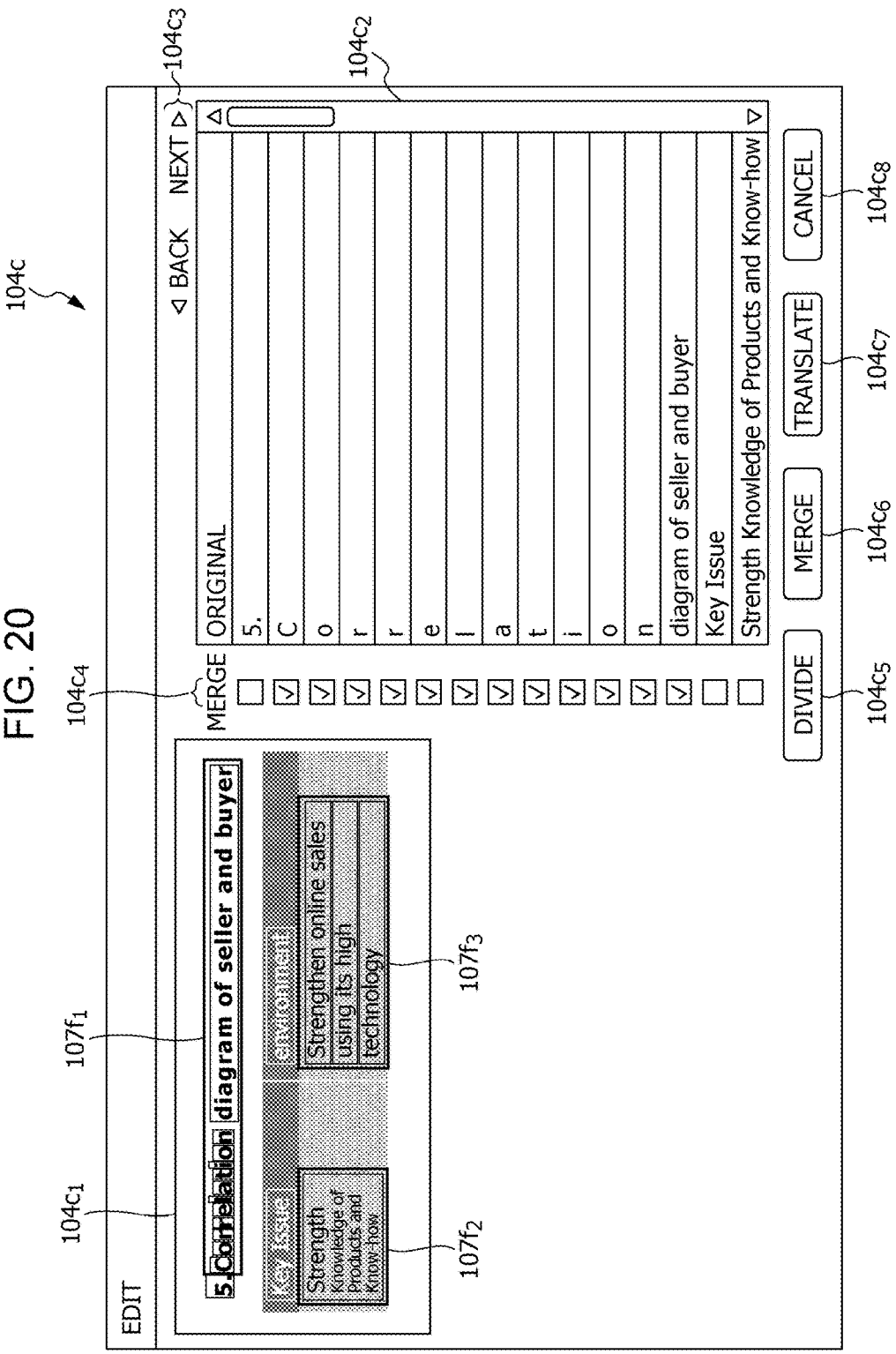

NON-TRANSITORY COMPUTER READABLE MEDIUM AND INFORMATION PROCESSING APPARATUS AND METHOD

CROSS-REFERENCE TO RELATED APPLICATIONS

This application is based on and claims priority under 35 USC 119 from Japanese Patent Application No. 2016-034242 filed Feb. 25, 2016.

BACKGROUND

Technical Field

The present invention relates to a non-transitory computer readable medium storing a translation program and an information processing apparatus and method.

SUMMARY

According to an aspect of the invention, there is provided a non-transitory computer readable medium storing a translation program causing a computer to execute a process. The process includes: displaying image information, text regions, and original text in association with each other, the text regions being obtained by extracting regions including an image of text from the image information, the original text being obtained by performing character recognition on the text included in the text regions; and editing the text regions in accordance with the content of a received operation.

BRIEF DESCRIPTION OF THE DRAWINGS

Exemplary embodiments of the present invention will be described in detail based on the following figures, wherein:

FIG. 1 is a block diagram illustrating an example of the configuration of an information processing apparatus according to an exemplary embodiment;

FIG. 2 is a schematic view illustrating an example of the configuration of a screen to be displayed when a request to translate a document is received;

FIG. 5 is a table indicating an example of the configuration of text region information;

FIG. 6 is a schematic view illustrating an example of the configuration of a screen displayed by a display controller;

FIG. 12 is a schematic view illustrating an example of the configuration of reliability degree information;

FIG. 20 is a schematic view illustrating an example of the configuration of a screen displayed by the display controller.

DETAILED DESCRIPTION

Figure 3:
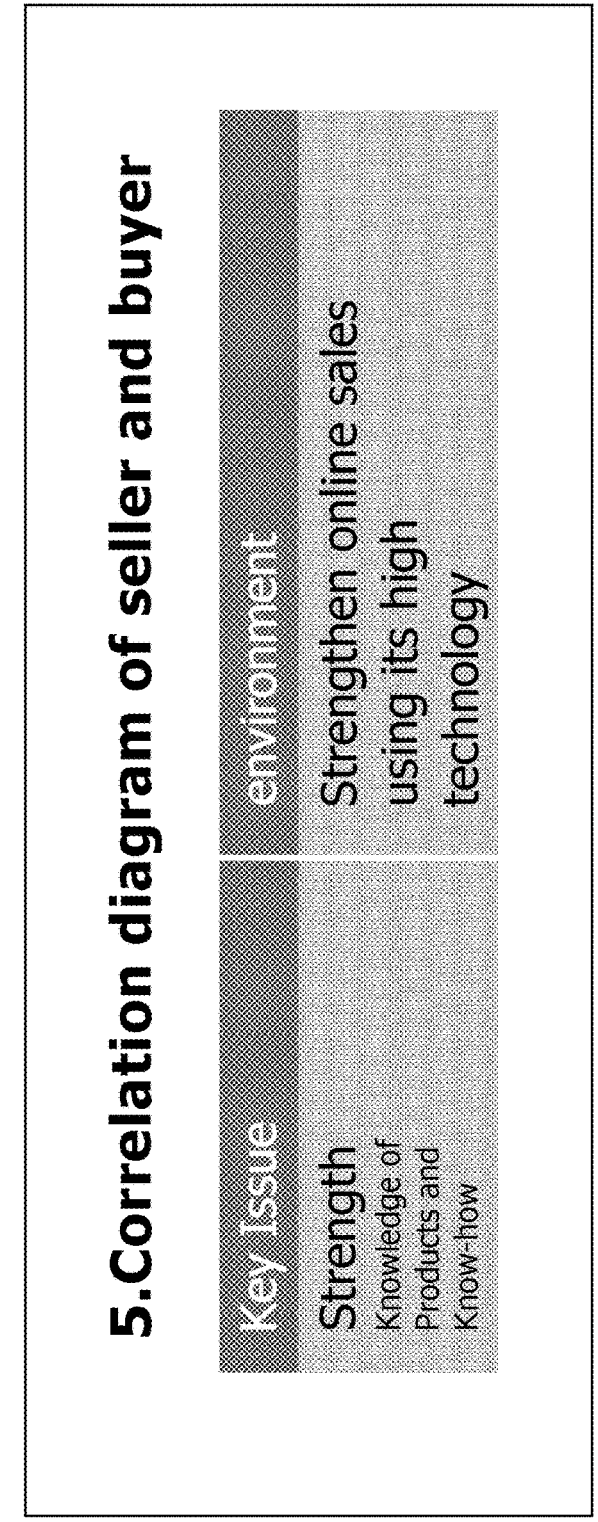
FIG. 3 is a schematic view illustrating an example of the configuration of image information received by a document receiver.

[First Exemplary Embodiment]
(Configuration of Information Processing Apparatus)

FIG. 1 is a block diagram illustrating an example of the configuration of an information processing apparatus 1 according to a first exemplary embodiment.

The information processing apparatus 1 includes a control device 10, a storage device 11, and a communication device 12. The control device 10, which is constituted by, for example, a central processing unit (CPU), controls the individual elements of the information processing apparatus 1 and also executes various programs. The storage device 11 is constituted by a storage medium, such as a flash memory, and stores information therein. The communication device 12 communicates with an external source via a network.

By executing a translation program 110, which will be discussed later, the control device 10 is able to serve as a document receiver 100, a text region extractor 101, a text recognizer 102, a translator 103, a display controller 104, a text region editor 105, a reliability degree calculator 106, and a text region estimator 107.

The document receiver 100 receives document information from an external source via the communication device 12. The document information is image information indicating characters and images or image information indicating images obtained by scanning printed matter including characters and images.

If text is in included in the image information received by the document receiver 100, the text region extractor 101 extracts regions where text items are disposed, as text regions. The text region extractor 101 registers the coordinates, height, and width of each of the extracted text regions in text region information 111 of the storage unit 11.

The text recognizer 102 recognizes the text included in each of the text regions extracted by the text region extractor 101 by using, for example, an optical character recognition (OCR) technique, so as to generate text information. The text recognizer 102 also registers the generated text information in the text region information 111 as the original text.

The translator 103 translates the text information generated by the text recognizer 102 as the original text into another language so as to generate translated text.

The display controller 104 displays an operation screen, and also displays the received image information and the original text in association with each other by referring to the text region information 111.

The text region editor 105 merges text regions or divides a text region automatically or in accordance with the content of an operation performed by a user.

The reliability degree calculator 106 calculates, as an index, the reliability degree representing how much a character string included in a text region is reliable as a character string.

The text region estimator 107 merges text regions having a low reliability degree or divides a text region having a low reliability degree. Approaches to merging text regions and dividing a text region will be discussed later.

In the storage device 11, the translation program 110, the text region information 111, and reliability degree information 112 are stored. The translation program 110 causes the control device 10 to operate as the document receiver 100, the text region extractor 101, the text recognizer 102, the translator 103, the display controller 104, the text region editor 105, the reliability degree calculator 106, and the text region estimator 107.

The information processing apparatus 1 is connected to a terminal (not shown) via the communication device 12, and executes processing in response to a request from the terminal and transmits the processing result to the terminal. The terminal receives the processing result and displays a screen indicating the processing result on a display. The screen displayed on the terminal will be discussed later.
(Operation of Information Processing Apparatus)

The operation of the information processing apparatus of the first exemplary embodiment will now be described below.

A user first accesses the information processing apparatus 1 by using a terminal (not shown) and requests the information processing apparatus 1 to translate a document.

The information processing apparatus 1 receives a request from the user and causes a display of the terminal to display the following screen.

FIG. 2 schematically illustrates an example of the configuration of a screen 104a to be displayed on the display of the terminal when a request to translate a document is received from the user.

The screen 104a includes a selection field $104a_1$ for selecting a source (original) language, a selection field $104a_2$ for selecting a target language, a selection field $104a_3$ for selecting a document to be translated, and a selection field $104a_4$ for selecting a page of the document to be translated. The screen 104a also includes buttons $104a_5$, one of which is used for instructing the execution of translation and the other one of which is used for instructing the canceling of a request.

The user selects one of the source languages in the selection field $104a_1$, selects one of the target languages in the selection field $104a_2$, specifies the document to be translated (document information) in the selection field $104a_3$, selects a page of the document to be translated in the selection field $104a_4$, and then presses the button $104a_5$ for instructing the execution of translation.

Figure 10:
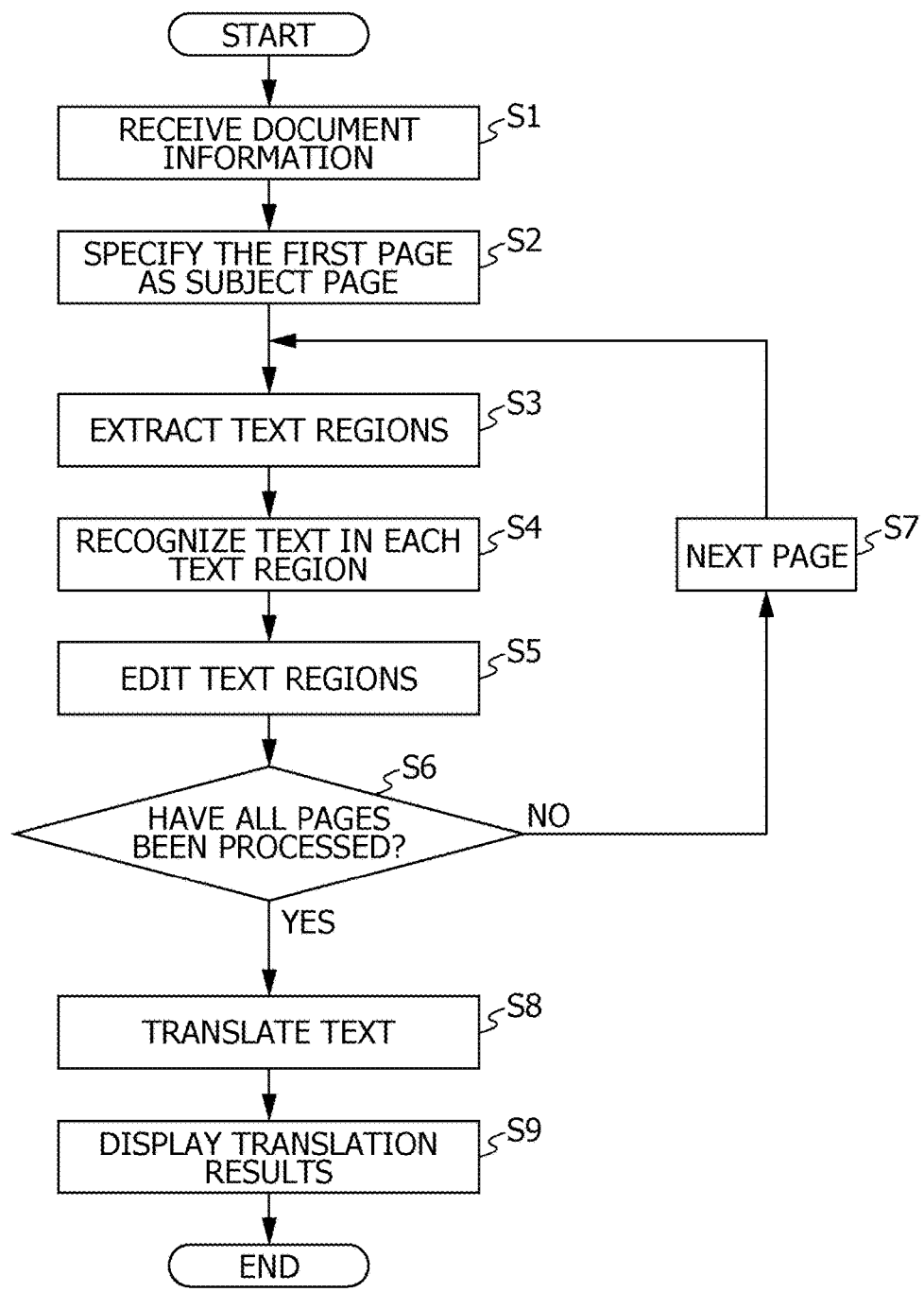
FIG. 10 is a flowchart illustrating an example of an operation performed by the information processing apparatus.

FIG. 10 is a flowchart illustrating an example of the operation performed by the information processing apparatus 1.

In step S1, the document receiver 100 receives document information concerning a document specified in the selection field $104a_3$. The document information is, for example, the following image information.

FIG. 3 schematically illustrates an example of the configuration of image information 100a received by the document receiver 100.

The image information 100a has a title "5. Correlation of diagram of seller and buyer" and a table constituted by items "Key Issue" and "environment".

Then, in step S2, the text region extractor 101 specifies the first page of the image information 100a received by the receiver 100 as the subject page. In step S3, the text region extractor 101 extracts, as text regions, regions where text items are disposed in the first page. The text regions may be extracted by using a technique such as the layout structure recognition in a document image.

Figure 4:
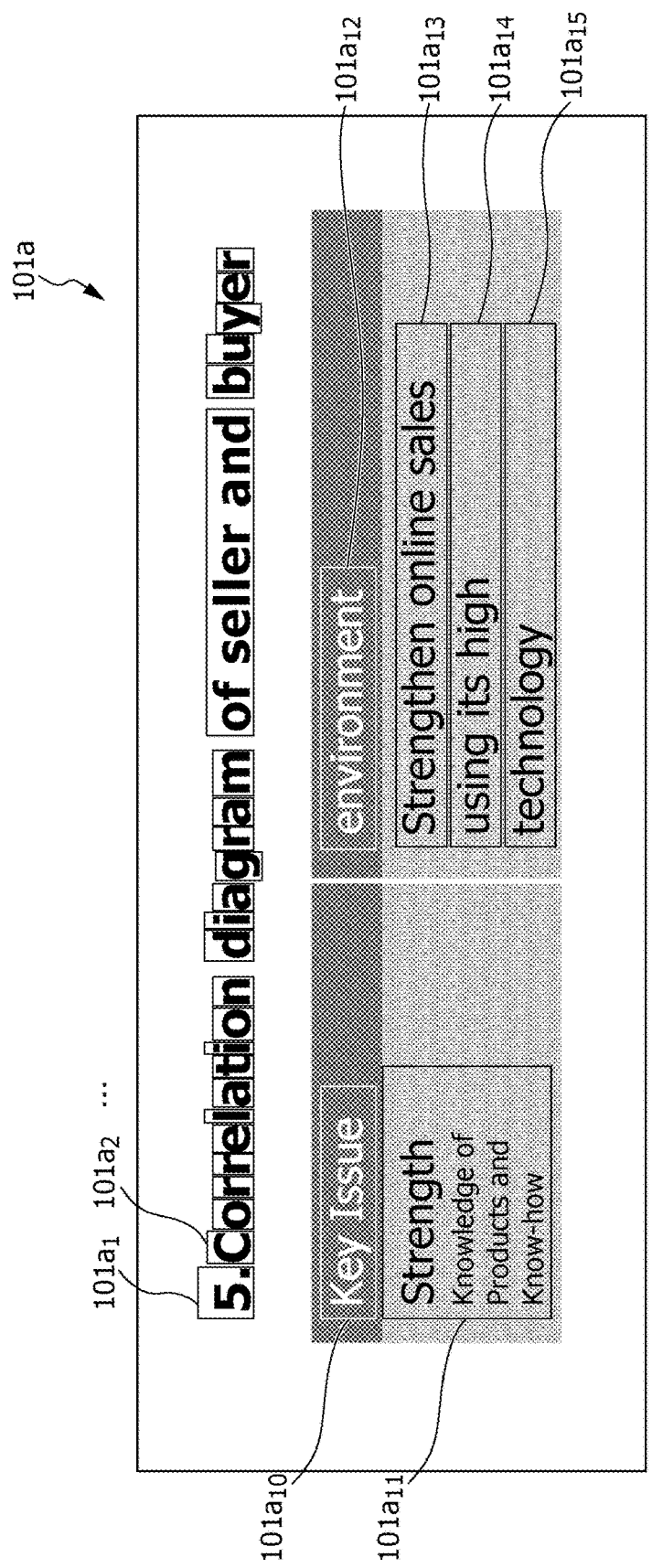
FIG. 4 is a schematic view illustrating examples of text regions extracted by a text region extractor.

FIG. 4 schematically illustrates examples of the text regions extracted by the text region extractor 101.

Text regions $101a_1$ through $101a_{15}$ are extracted from the image information 100a by the text region extractor 101. A text region would normally be extracted according to the word or the phrase, such as in the text regions $101a_{10}$ and $101a_{12}$. However, there may be some cases in which a text region is extracted according to the character, such as in the text regions $101a_1$ and $101a_2$, and a text region is extracted as a set of words which does not make sense as a phrase, such as in the text region $101a_{11}$, or text regions are extracted as a word or a set of words at a position at which one phrase is split inappropriately, such as in the text regions $101a_{13}$ through $101a_{15}$.

Then, in step S4, the text recognizer 102 recognizes the text included in each of the text regions extracted by the text region extractor 101 by using, for example, an OCR technique, thereby generating the text region information 111.

FIG. 5 is a table indicating an example of the configuration of the text region information 111.

The text region information 111 indicates the original text obtained as a result of performing character recognition on the images within the text regions, the coordinates, height, and width of each of the extracted text regions, and the image of the text included in each of the text regions.

Figure 11:
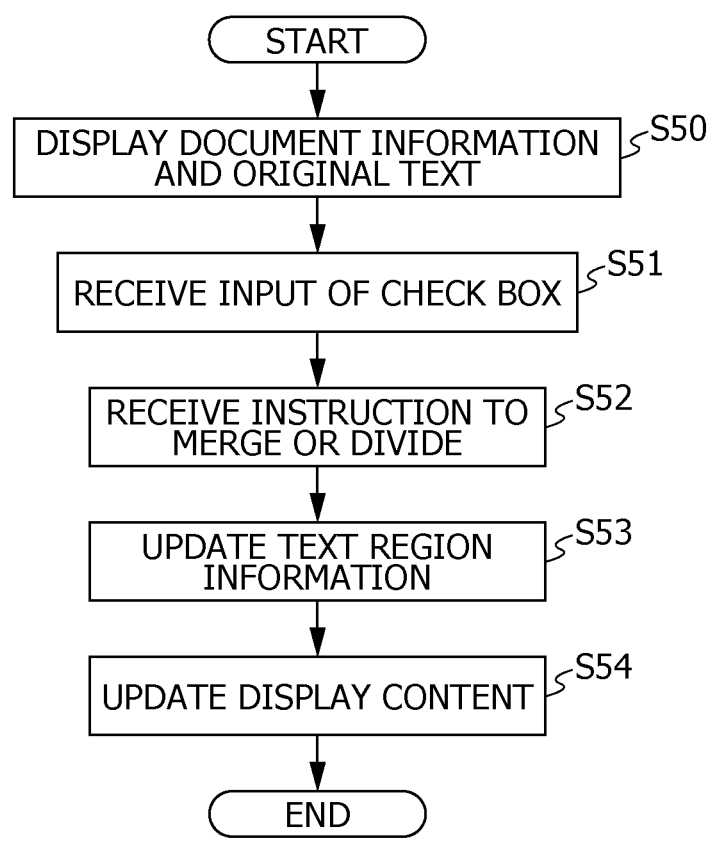
FIG. 11 is a flowchart illustrating an example of an operation performed by the information processing apparatus when editing text regions.

Then, in step S5, the display controller 104 displays the received image information and the original text in association with each other by referring to the text region information 111, and receives an editing operation of the image information displayed on the screen from the user. Details of step S5 are shown in the flowchart of FIG. 11. The above-described steps S3 through S5 are executed for each page of the document information. More specifically, it is determined in step S6 whether or not all the pages of the document information have been processed. If the result of step S6 is NO, the next page is set as the subsequent page in step S7. The process then returns to step S3 and steps S3 through S5 are repeated until it is determined in step S6 that all the pages of the document information have been processed.

FIG. 11 is a flowchart illustrating an example of the operation performed by the information processing apparatus 1 in step S5.

In step S50, the display controller 104 displays the document information (image information) and the original text, as indicated in the following screen shown in FIG. 6.

Figure 6:
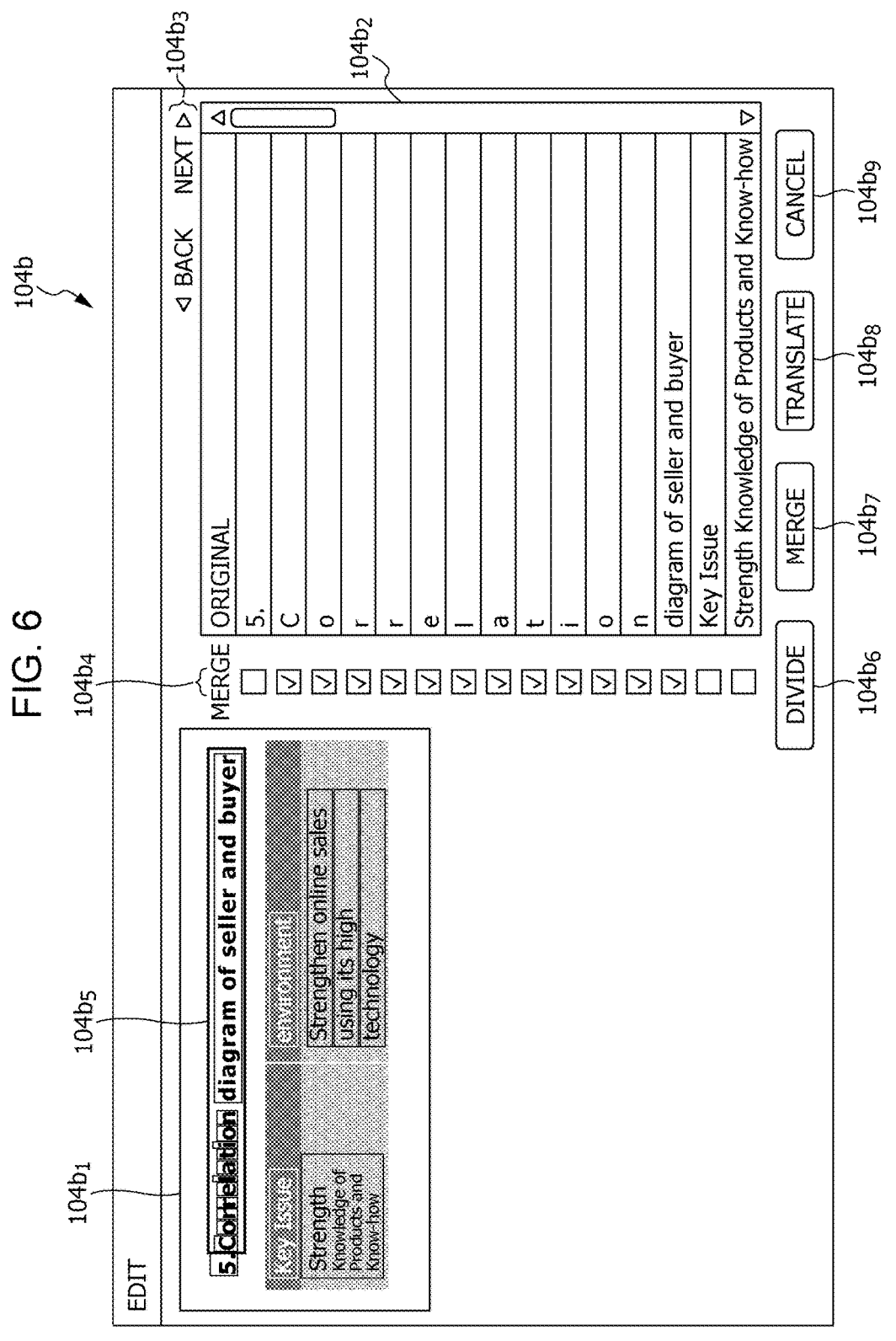

FIG. 6 schematically illustrates an example of the configuration of a screen 104b displayed by the display controller 104.

The screen 104b includes a document display region 104b₁ in which the received image information and the extracted text regions are displayed, and a character recognition result display region 104b₂ in which the original text is displayed. The screen 104b also includes a page switching button 104b₃ for switching the page if there are plural pages in the document information, merge check boxes 104b₄ for selecting text regions to be merged together, and a selection frame 104b₅ to be displayed in accordance with the check result of the merge check boxes 104b₄. The screen 104b also includes a divide button 104b₆ for dividing a text region by using a cursor, which will be discussed later, a merge button 104b₇ for merging the text regions for which the merge check boxes 104b₄ are checked, a translation button 104b₈ for translating the original text in all the text regions, and a cancel button 104b₉ for closing the screen 104b.

If one of the selection frame 104b₅ and the merge check boxes 104b₄ is selected, the other one is automatically selected. That is, if a text region in the document image is selected by using the selection frame 104b₅, the corresponding merge check boxes 104b₄ are checked, so that the user can identify how (as which characters) the text included in the selected text region is recognized. If a certain portion of the original text is selected by using the corresponding merge check box 104b₄, the selection frame 104b₅ appears within the document image, so that the user can identify in which text region the selected portion of the original text is included.

If the user checks merge check boxes 104b₄ on the screen 104b, the text region editor 105 receives the input of the merge check boxes 104b₄ in step S51.

Then, if the user presses the merge button 104b₇, the text region editor 105 receives the operation for pressing the merge button 104b₇ in step S52. Then, in step S53, the text region editor 105 merges the text regions corresponding to the selected merge check boxes 104b₄ and updates the text region information 111. Then, in step S54, the text region editor 105 updates the display content of the screen 104b, as shown in FIG. 7.

Figure 7:
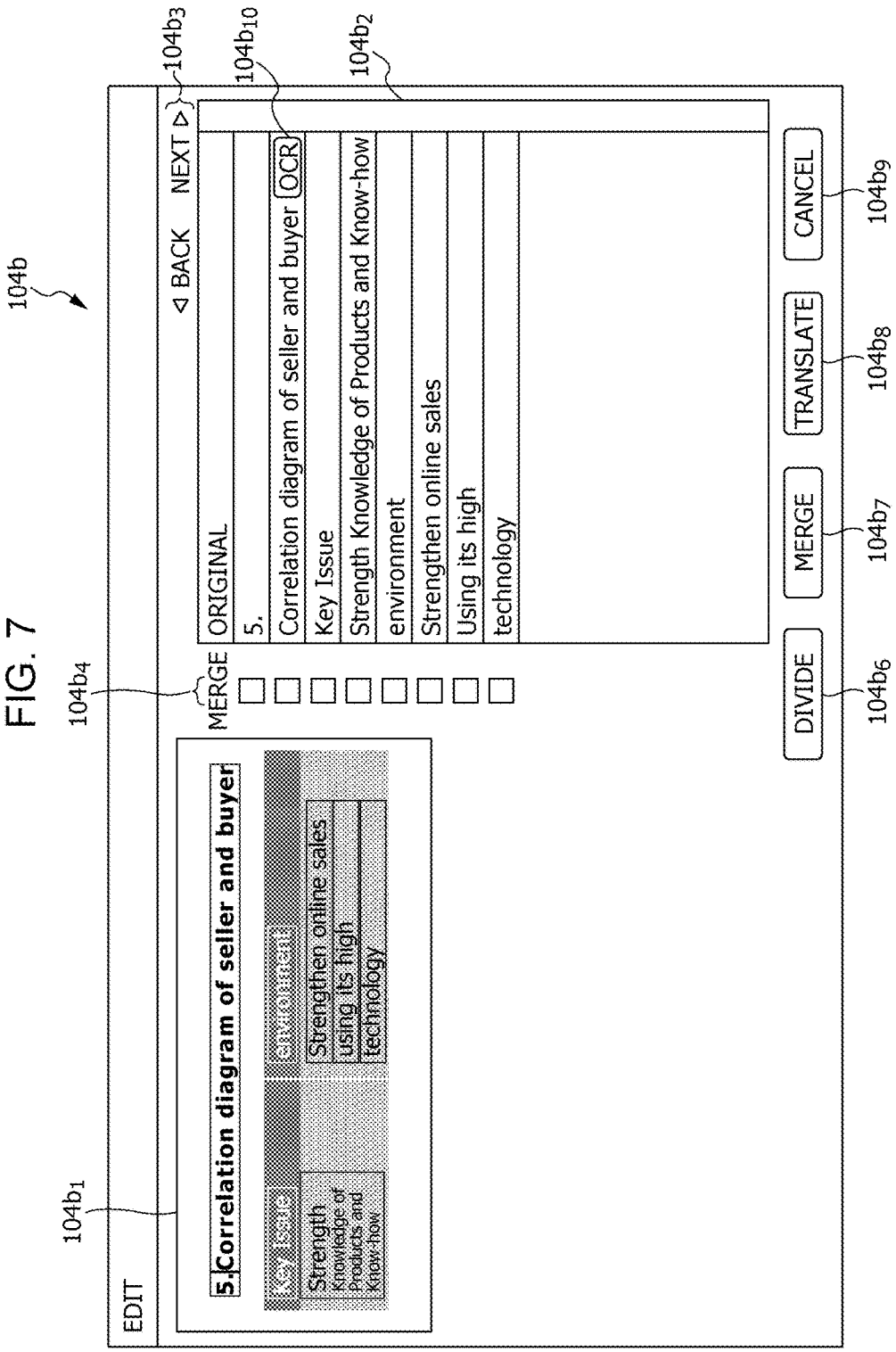
FIG. 7 is a schematic view illustrating another example of the configuration of a screen displayed by the display controller.

FIG. 7 schematically illustrates another example of the configuration of the screen 104b displayed by the display controller 104.

In accordance with the above-described operation, the text regions selected by using the selection frame 104b₅ are merged together, so that the character string within the merged text region is indicated as "Correlation diagram of seller and buyer". An OCR button 104b₁₀ has appeared in a portion corresponding to the merged text region in the character recognition result display region 104b₂. If the first character recognition in the merged text region is not correct, the user presses the OCR button 104b₁₀ so that the text recognizer 102 can recognize the text in the merged text region again.

In another example, if the user presses the divide button 104b₆, the text region editor 105 receives the operation for pressing the divide button 104b₆ in step S52. Then, in step S53, the text region editor 105 divides the corresponding text region and updates the text region information 111. Then, in step S54, the text region editor 105 updates the display content of the screen 104b, as shown in FIG. 8.

Figure 8:
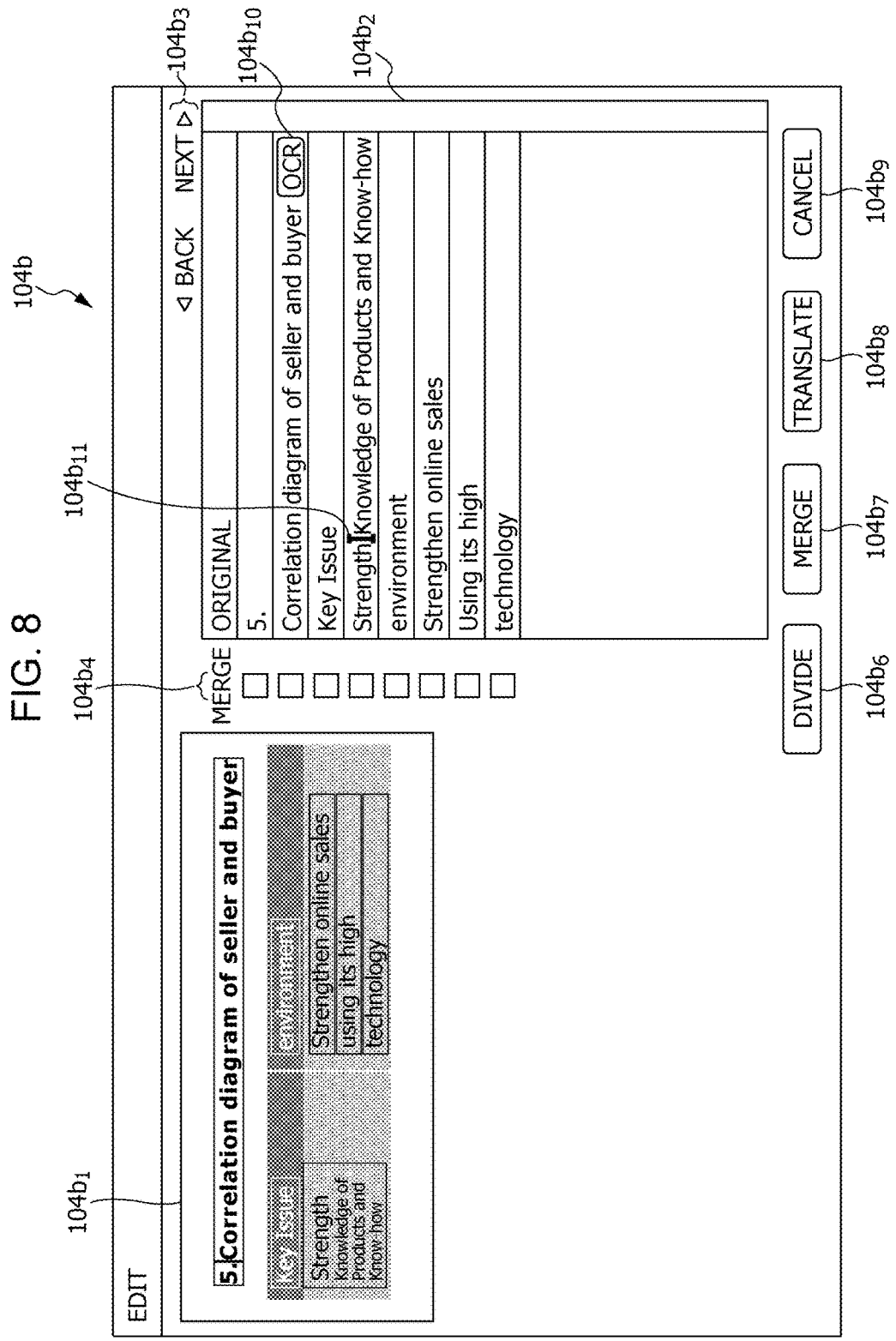
FIG. 8 is a schematic view illustrating another example of the configuration of a screen displayed by the display controller.
Figure 9:
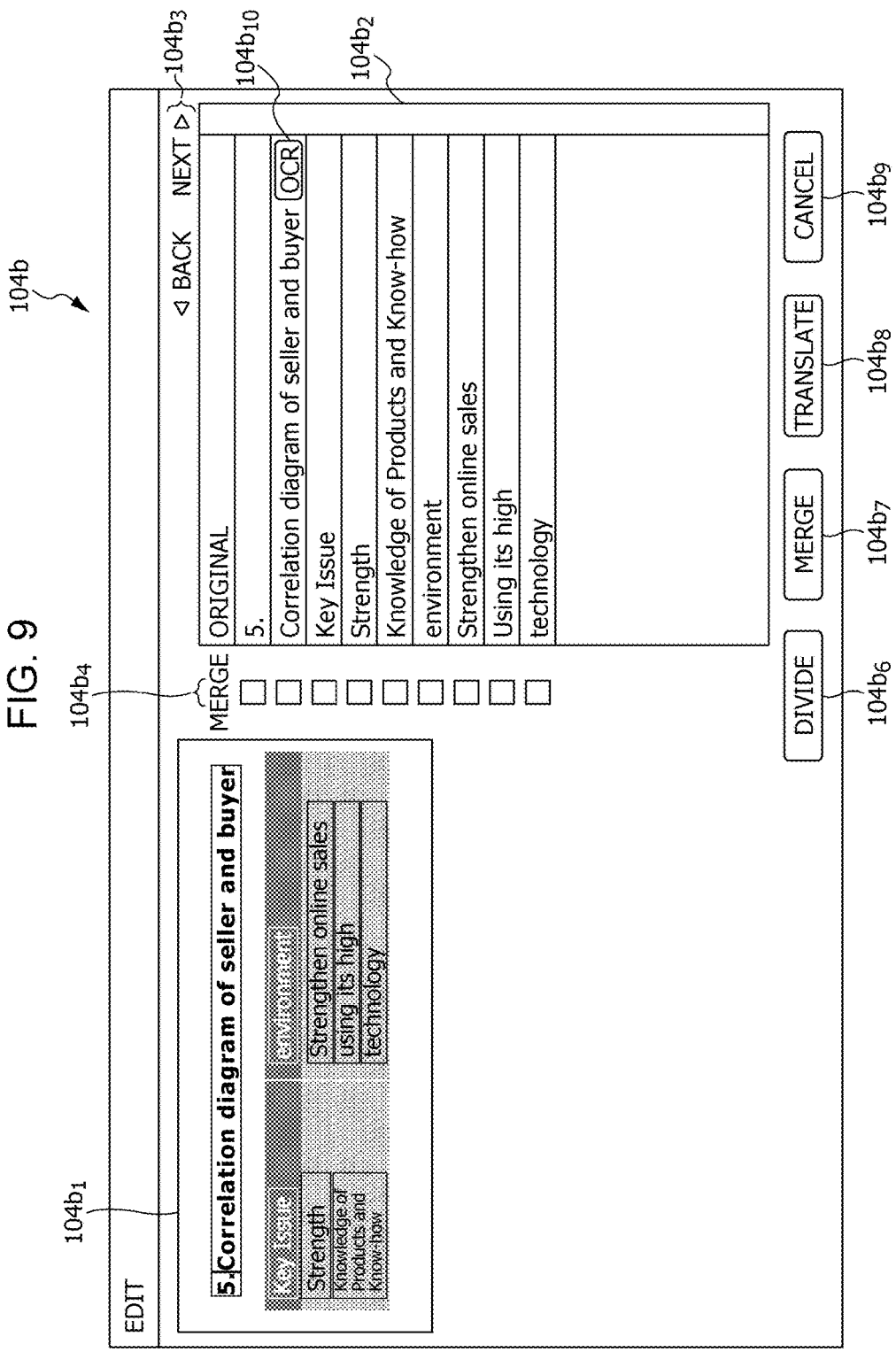
FIG. 9 is a schematic view illustrating another example of the configuration of a screen displayed by the display controller.

FIG. 8 schematically illustrates another example of the configuration of the screen 104b displayed by the display controller 104. FIG. 9 schematically illustrates another example of the configuration of the screen 104b displayed by the display controller 104.

As shown in FIG. 8, the user specifies a position at which the text region will be divided by using a cursor 104b₁₁, and presses the divide button 104b₆. In accordance with this operation, the character string "Strength Knowledge of Products and Know-how" within the text region is divided into "Strength" and "Knowledge of Products and Know-how", as shown in FIG. 9.

Then, if the user judges that the text regions are appropriately merged or divided, the user presses the translation button 104b₈.

In step S8 of FIG. 10, the translator 103 sets the text information generated by the text recognizer 102 to be the original text, and translates the original text into another language so as to generate translated text. Then, in step S9, the display controller 104 disposes the translated text within the associated text regions of the document information so as to display the translation results on the display of the terminal. When the display controller 104 disposes the translated text, the font size and font type of the translated text are selected by considering the height and width of each text region.

[Second Exemplary Embodiment]

A second exemplary embodiment of the invention will be described below. The second exemplary embodiment is different from the first exemplary embodiment in that it is determined whether or not it is more suitable if text regions extracted by the text region extractor 101 are merged or divided, and, if it is such a case, a new text region is estimated. The configuration of the second exemplary embodiment is similar to that of the first exemplary embodiment, and an explanation thereof will thus be omitted.

In a manner similar to the first exemplary embodiment, the information processing apparatus 1 executes steps S1 through S4 in FIG. 10. Then, the reliability degree calculator 106 calculates the reliability degree of each text item recognized by the text recognizer 102, and generates reliability degree information 112, as shown in FIG. 12.

FIG. 12 schematically illustrates an example of the configuration of the reliability degree information 112.

The reliability degree calculator 106 calculates the reliability degree of each text item in the original text by making the following determinations. If a text item is a character or a word, it is determined whether or not the character or the word is included in a prepared dictionary. If a text item is a sentence, it is determined whether or not it is grammatically correct. In the reliability degree information 112 shown in FIG. 12, for example, "C", "o", "r" "r", "e", "l", "a", "t", "i", "o", and "n", which are each constituted by one alphabetical character, are not registered in the dictionary as a word. Accordingly, the reliability degree calculator 106 calculates the reliability degree of these text items to be 0. The text item "Strength Knowledge of Products and Know-how" is not grammatically correct since "Strength" is not suitable in this text item. Accordingly, the reliability degree calculator 106 calculates the reliability degree of this text item to be 50. Similarly, the text item "Using its high" is not grammatically correct, and the reliability degree calculator 106 calculates the reliability degree of this text item to be 40.

The display controller 104 may display the content of the reliability degree information 112 shown in FIG. 12 for the user.

Then, the text region estimator 107 creates all possible combinations of thirteen text items for which the reliability degree is calculated to be equal to or lower than a predetermined threshold (for example, 50). The combinations of the text items are formed into a list 107a, as shown in FIG. 13.

Figure 13:
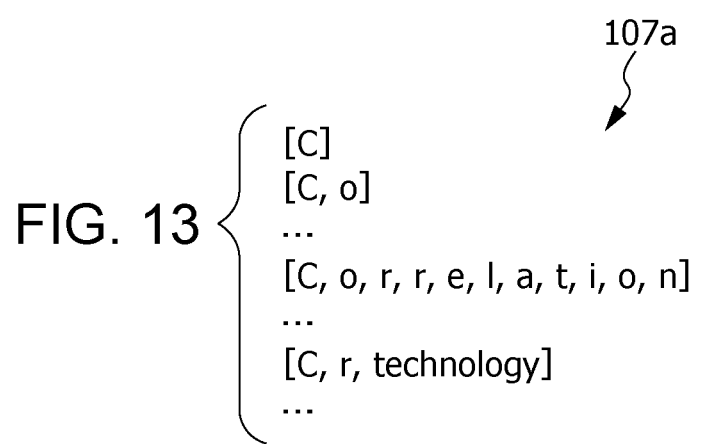
FIG. 13 is a schematic view illustrating an example of the configuration of a list created by a text region estimator.

FIG. 13 schematically illustrates an example of the configuration of the list 107a created by the text region estimator 107.

The number of combinations included in the list 107a is $2^{13}$=8192.

Figure 14:
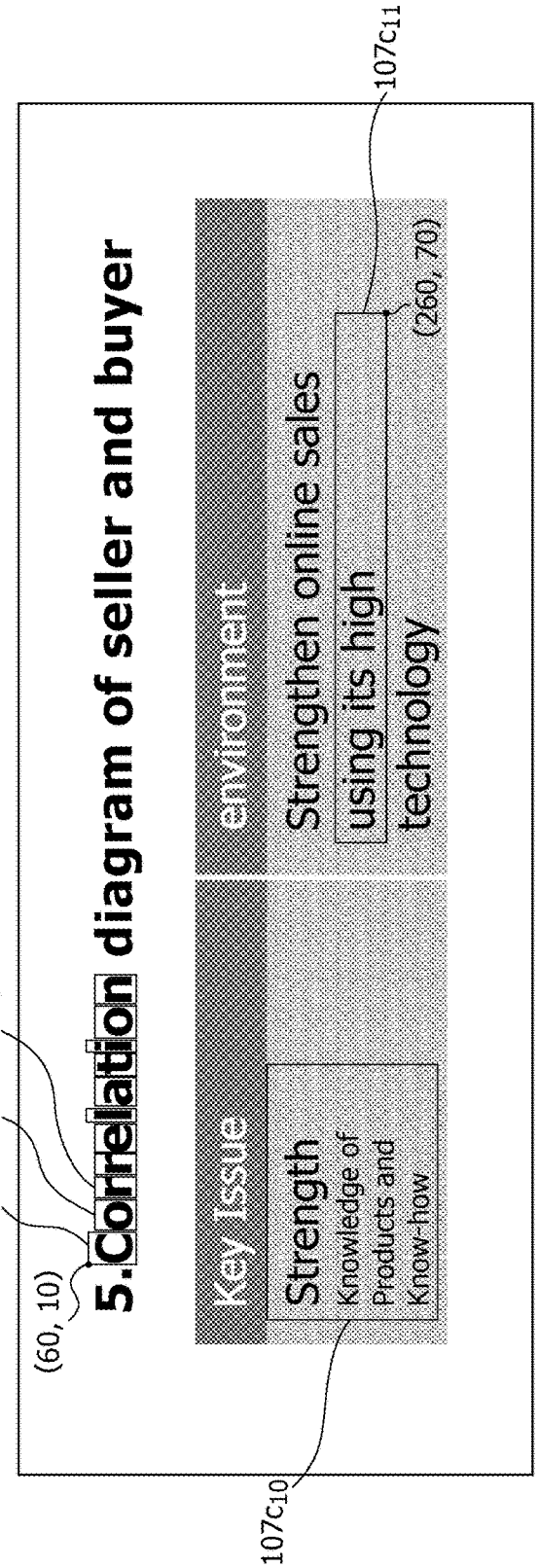
FIG. 14A is a schematic view illustrating the configuration of a list created by the text region estimator.
FIG. 14B is a schematic view illustrating examples of the coordinates of text items in document information.

Then, the text region estimator 107 assumes all the combinations of the text items included in the list 107a as new text regions. The text region estimator 107 then adds the coordinates at the top left of each new text region and the width and height of each new text region to the list 107a as information, thereby creating a new list 107b, as shown in FIG. 14A.

FIG. 14A schematically illustrates the configuration of the list 107b created by the text region estimator 107, and FIG. 14B schematically illustrates examples of the coordinates of text items in document information.

As shown in FIG. 14A, in the list 107b, the coordinates of the top left of each new text region and the width and height of each new text region are indicated. For example, concerning a text region [C, o, r, r, e, l, a, t, i, o, n], the coordinates at the top left of a text region $107c_1$ including "C" are (60, 10), as shown in FIG. 14B, and the width and height of the entire text region are (70, 12), as shown in FIG. 14A. Accordingly, [C, o, r, r, e, l, a, t, i, o, n] are indicated as [C, o, r, r, e, l, a, t, i, o, n: 60, 10, 70, 12] in the list 107b. Concerning [C, r, using its high], the coordinates at the bottom right of a text region $107c_{11}$ including "using its high" are (260, 70), and thus, the width and height are (200, 60). Accordingly, [C, r, using its high] is indicated as [C, r, using its high: 60, 10, 200, 60].

Then, the text region estimator 107 calculates, from the list 107b, the area of the new text region and the total area of the original text regions included in the new text region, and compares the two areas with each other.

Figure 15:
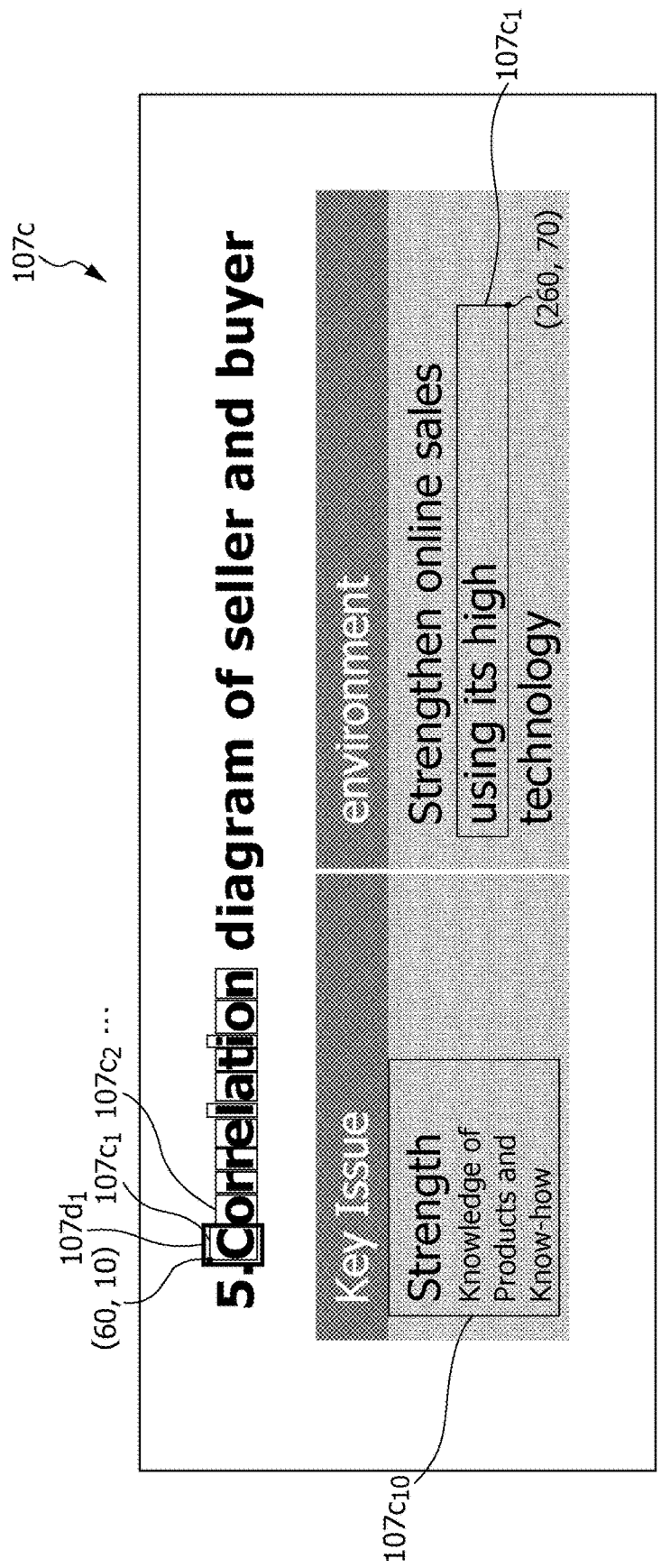
FIG. 15 is a schematic view illustrating an example of an area comparing operation performed by the text region estimator.

FIG. 15 illustrates an example of the area comparing operation performed by the text region estimator 107.

The area of a new text region $107d_1$ corresponding to the topmost line of the list 107b [C: 60, 10, 8, 12] is 8×12=96. The area of the text region $107c_1$ of the original text "C" included in the new text region $107d_1$ is 8×12=96. The ratio between the two areas is 96/96=1.

If the ratio between the two areas is equal to or higher than a predetermined threshold (for example, 0.7), the text region estimator 107 determines the new text region $107d_1$ to be a new text region candidate.

Figure 16:
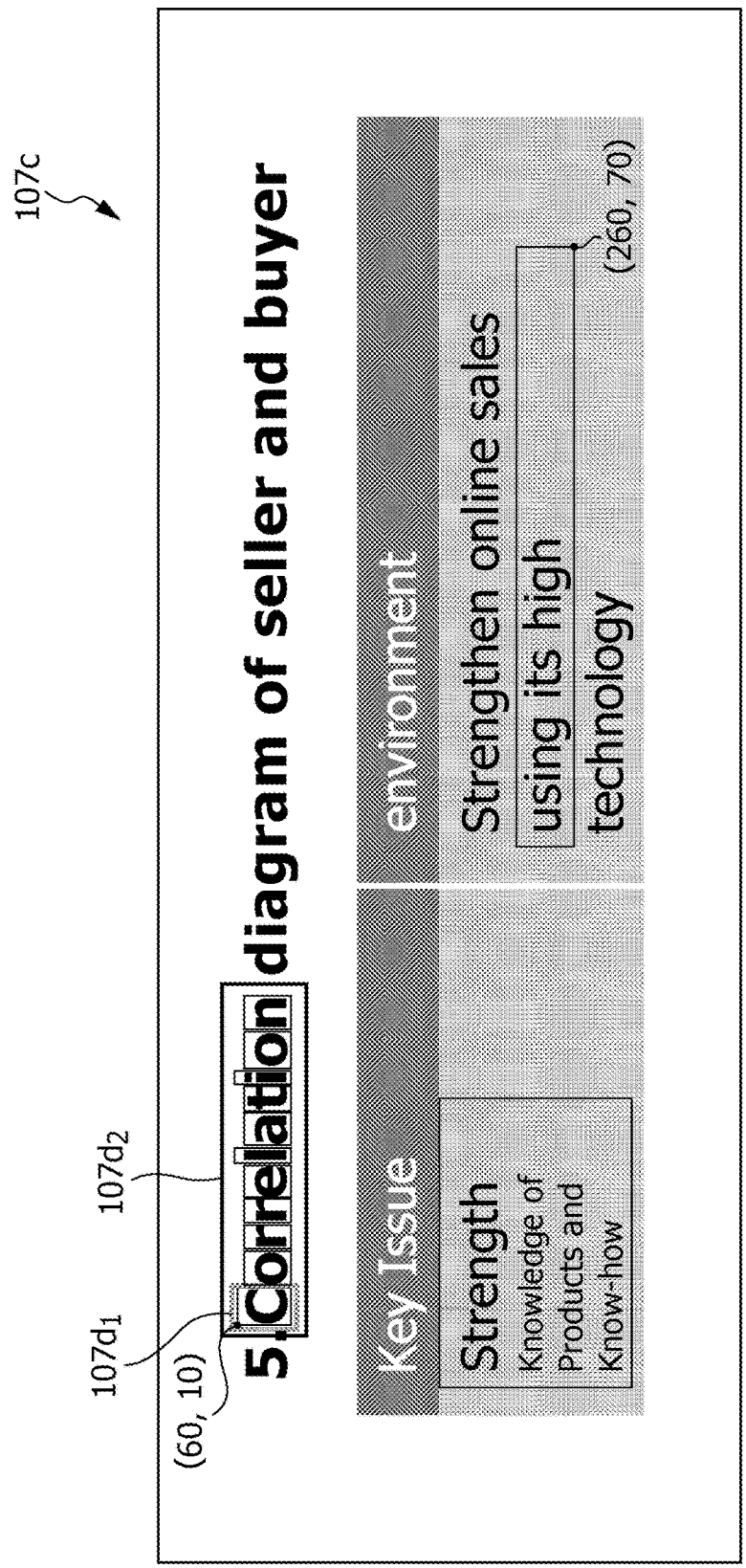
FIG. 16 is a schematic view illustrating another example of the area comparing operation performed by the text region estimator.

FIG. 16 illustrates another example of the area comparing operation performed by the text region estimator 107.

The area of a new text region $107d_2$ corresponding to [C, o, r, r, e, l, a, t, i, o, n: 60, 10, 70, 12] in the list 107b is 70×12=840. The total area of the text regions $107c_1$ through $107c_{11}$ of the original text items "C", "o", "r" "r", "e", "l", "a", "t", "i", "o", and "n" included in the new text region $107d_2$ is 750. The ratio between the two areas is 750/840=0.89.

If the ratio between the two areas is equal to or higher than the predetermined threshold (for example, 0.7) and is not 1, the text region estimator 107 determines the new text region $107d_2$ to be a new text region candidate and eliminates the new text region $107d_1$ for which the ratio is calculated to be 1 from text region candidates. The reason for this is that the user can more easily identify text in a region of a larger area.

Figure 17:
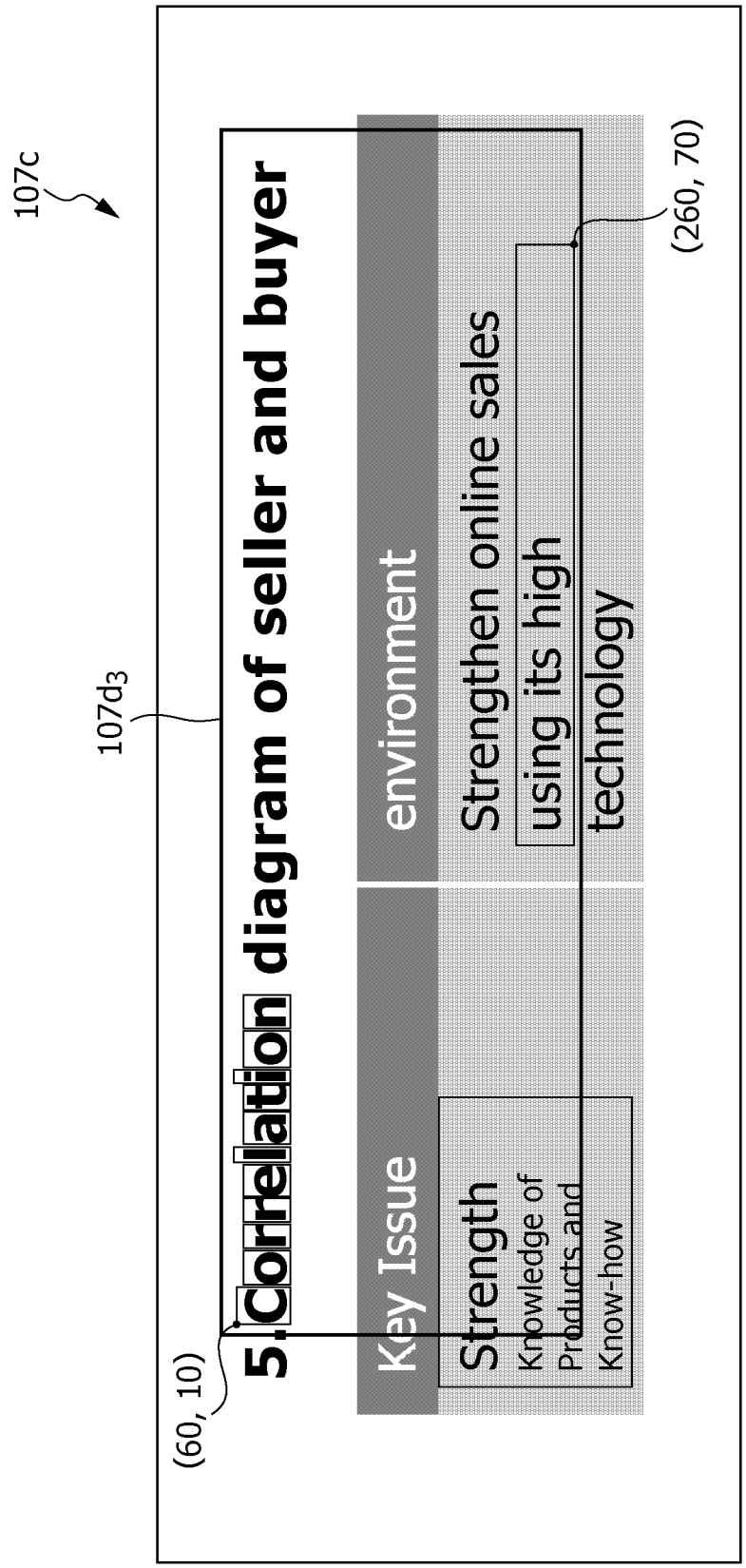
FIG. 17 is a schematic view illustrating another example of the area comparing operation performed by the text region estimator.

FIG. 17 illustrates another example of the area comparing operation performed by the text region estimator 107.

The area of a new text region $107d_3$ corresponding to [C, r, using its high: 60, 10, 200, 60] in the list 107b is 200×60=12000. The total area of the text regions $107c_1$, $107c_3$, and $107c_{11}$ of the original text items "C", "r", "using its high" included in the new text region $107d_3$ is 1200. The ratio between the two areas is 1200/12000=0.10.

If the ratio between the two areas is lower than the predetermined threshold (for example, 0.7), the text region estimator 107 does not set the new text region $107d_3$ to be a new text region candidate.

Figure 18:
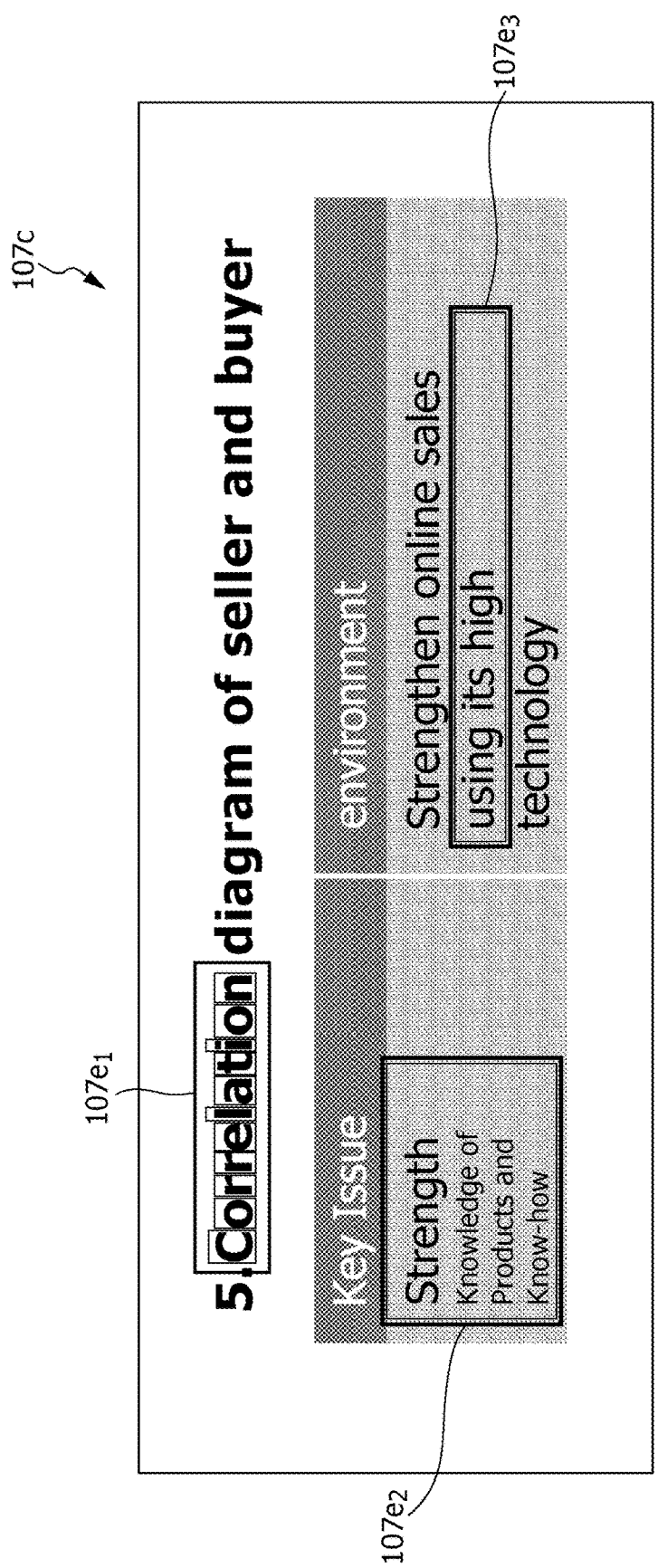
FIG. 18 is a schematic view illustrating examples of new text region candidates estimated by the text region estimator.

Concerning all the new text regions in the list 107b, the text region estimator 107 performs the above-described calculations, and, as a result, new text region candidates are determined, as shown in FIG. 18.

FIG. 18 schematically illustrates examples of new text region candidates estimated by the text region estimator 107.

The text region estimator 107 estimates new text region candidates $107e_1$ through $107e_3$ by performing the above-described calculations.

The text region estimator 107 may also merge a text region having a sufficiently high reliability degree with the new text region candidates $107e_1$ through $107e_3$.

Figure 19:
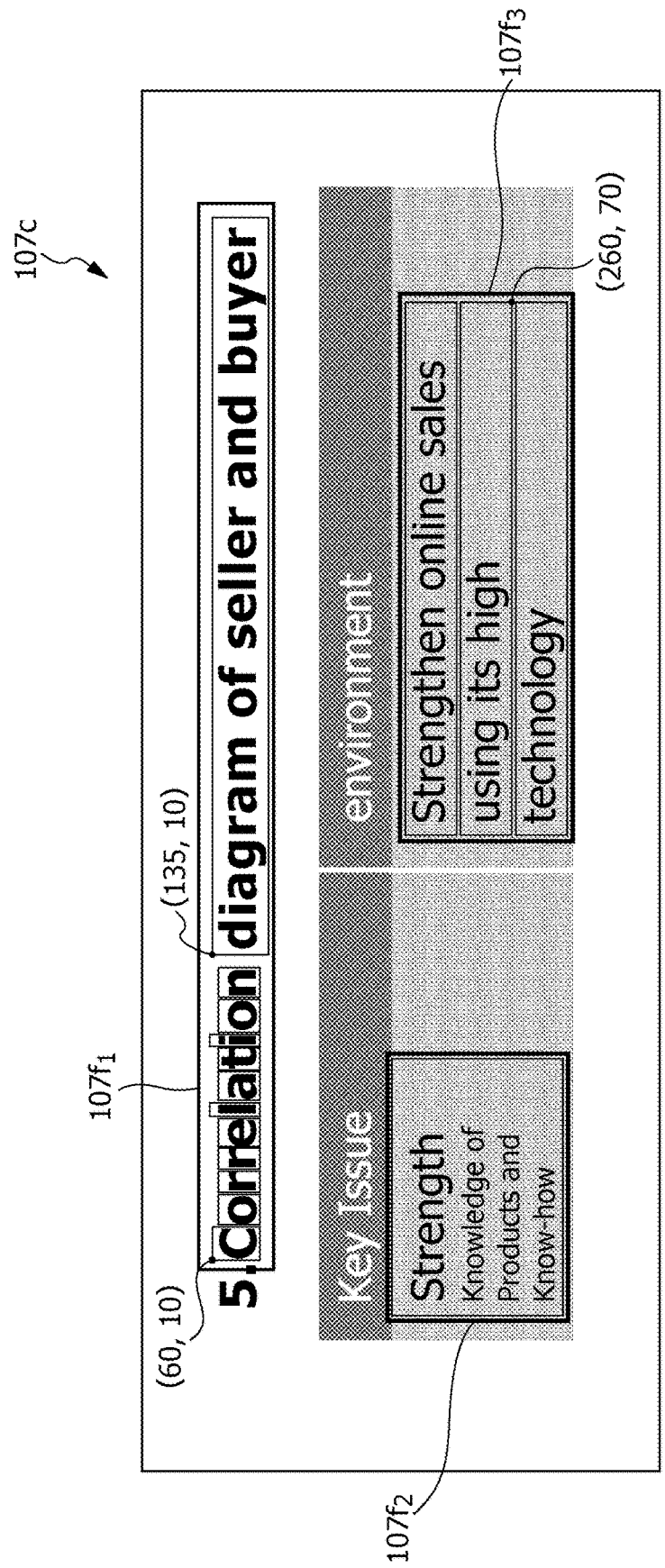
FIG. 19 is a schematic view illustrating other examples of new text region candidates estimated by the text region estimator.

FIG. 19 schematically illustrates an example of new text region candidates estimated by the text region estimator 107.

For example, the y coordinate at the top left of the new text region candidate $107e_1$ in FIG. 18 and that of the text region "diagram of seller and buyer" are both 10 and are thus equal to each other. Accordingly, the text region estimator 107 merges this text region with the text region candidate $107e_1$, and then causes the reliability degree calculator 106 to calculate the reliability degree of the merged text region "Correlation diagram of seller and buyer". If the reliability degree is equal to or higher than the predetermined threshold, the text region estimator 107 determines the merged text region to be a new text region candidate $107f_1$, as shown in FIG. 19.

The x coordinate at the top left of the new text region candidate $107e_3$ in FIG. 18 is equal to that of the text regions "Strengthen online sales" and "technology". Accordingly, the text region estimator 107 merges these two text regions with the new text region candidate $107e_3$, and then causes the reliability degree calculator 106 to calculate the reliability degree of the merged text region "Strengthen online sales using its high technology". If the reliability degree is equal to or higher than the predetermined threshold, the text region estimator 107 determines the merged text region to be a new text region candidate $107f_3$, as shown in FIG. 19.

Then, the display controller 104 causes merge check boxes $104c_4$ on a screen 104c shown in FIG. 20 to be automatically checked so that the original text regions $107c_1$ through $107c_{11}$ shown in FIG. 14B will be changed to the new text regions $107f_1$ through $107f_3$ shown in FIG. 19 estimated by the text region estimator 107.

FIG. 20 schematically illustrates an example of the configuration of the screen 104c displayed by the display controller 104.

The configuration of the screen 104c is similar to that of the screen 104b shown in FIG. 6, and the merge check boxes $104c_4$ are checked by the text region estimator 107. The display controller 104 displays the screen 104c in this manner and receives an editing operation from the user, as in the first exemplary embodiment.

The display controller 104 may display the content of the screens shown in FIGS. 14 through 19.

[Other Exemplary Embodiments]

The present invention is not restricted to the above-described exemplary embodiments, and various modifications may be made without departing from the spirit of the invention.

In the above-described exemplary embodiments, the functions of the document receiver 100, the text region extractor 101, the text recognizer 102, the translator 103, the display controller 104, the text region editor 105, the reliability degree calculator 106, and the text region estimator 107 of the control device 10 are implemented by a program. Alternatively, all or some of these functions may be implemented by hardware, such as an application-specific integrated circuit (ASIC). The program used in the above-described exemplary embodiments may be stored in a recording medium such as a compact disc-read only memory (CD-ROM) and be provided. Additionally, swapping, deletion, and addition of steps discussed in the above-described exemplary embodiments may be performed without departing from the spirit of the invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a translation program causing a computer to execute a process, the process comprising:
    displaying, on a display device of an information processing apparatus, image information, text regions, and original text in association with each other, the text regions being obtained by extracting regions including an image of text from the image information, the original text being obtained by performing character recognition on the text included in the text regions;
    receiving an editing operation of the text regions displayed on the display device from a user; and
    editing the text regions in accordance with the content of the editing operation received on the display device of the information processing apparatus, wherein,
    in the displaying, merge boxes for selecting two or more of the text regions to be merged are displayed on the display device in association with the original text, and a merge button is further displayed, and
    in the editing of the text regions,
        selecting of respective merge boxes for the two or more of the text regions or selecting of a portion of the displayed original text is received as part of the content of the received operation, and
        in response to the selecting of the respective merge boxes for the two or more of the text regions and in accordance with a merge instruction received on the display device by operation of the merge button, the two or more of the text regions displayed on the display device as separate text regions are merged together so as to be displayed on the display device as a single text region.

2. The non-transitory computer readable medium according to claim 1, wherein, in the editing of the text regions,
    in accordance with a divide instruction received on the display device, a single text region displayed on the display device is divided so as to be displayed on the display device as two or more separate text regions.

3. The non-transitory computer readable medium according to claim 2, the process further comprising:
    calculating a reliability degree of each of the text regions on the basis of the content of the original text extracted from a corresponding text region,
    wherein a text region for which the reliability degree is calculated to be lower than a predetermined threshold is displayed as a text region candidate to be corrected.

4. The non-transitory computer readable medium according to claim 2, the process further comprising:
    calculating a reliability degree of each of the text regions on the basis of the content of the original text extracted from a corresponding text region; and
    estimating a new text region candidate on the basis of an area of a new text region obtained by merging text regions for which the reliability degree is calculated to be lower than a predetermined threshold and on the basis of a total area of the text regions which have not been merged,
    wherein the estimated new text region candidate is displayed.

5. The non-transitory computer readable medium according to claim 1, the process further comprising:
    calculating a reliability degree of each of the text regions on the basis of the content of the original text extracted from a corresponding text region,
    wherein a text region for which the reliability degree is calculated to be lower than a predetermined threshold is displayed as a text region candidate to be corrected.

6. The non-transitory computer readable medium according to claim 1, the process further comprising:
    calculating a reliability degree of each of the text regions on the basis of the content of the original text extracted from a corresponding text region; and
    estimating a new text region candidate on the basis of an area of a new text region obtained by merging text regions for which the reliability degree is calculated to be lower than a predetermined threshold and on the basis of a total area of the text regions which have not been merged,
    wherein the estimated new text region candidate is displayed.

7. The non-transitory computer readable medium according to claim 1, the process further comprising:
    calculating a reliability degree of each of the text regions; and
    merging text regions for which the reliability degree is calculated to be lower than a predetermined threshold.

8. The non-transitory computer readable medium according to claim 1, the process further comprising:
    calculating a reliability degree of each of the text regions; and
    merging or splitting text regions for which the reliability degree is calculated to be lower than a predetermined threshold such that a resulting merged or split text region has a reliability degree higher than the predetermined threshold.

9. The non-transitory computer readable medium according to claim 1, further comprising:
    generating text region information indicating (i) the original text, (ii) a coordinate, a height and a width of each of the text regions, and (iii) the image of the text included in each of the text regions.

10. An information processing apparatus comprising:
    a display controller that displays, on a display device of the information processing apparatus, image information, text regions, and original text in association with each other, the text regions being obtained by extracting regions including an image of text from the image information, the original text being obtained by performing character recognition on the text included in the text regions;
an operation receiver that receives an editing operation of the text regions displayed on the display device from a user; and
a text region editor that edits the text regions in accordance with the content of the editing operation received on the display device of the information processing apparatus, wherein
the display controller further displays on the display device
  merge boxes for selecting two or more of the text regions to be merged in association with the original text, and
  a merge button,
the operation receiver receives, as part of the content of the received operation, selection of respective merge boxes for the two or more of the text regions or selection of a portion of the displayed original text, and
in response to the selection of the respective merge boxes for the two or more of the text regions and in accordance with a merge instruction received by the operation receiver on the display device by operation of the merge button, the text region editor merges together the two or more of the text regions displayed on the display device as separate text regions so as to be displayed on the display device as a single text region.

11. The information processing apparatus according to claim 10, further comprising:
a reliability degree calculator that calculates a reliability degree of each of the text regions, wherein
the text region editor merges text regions for which the reliability degree is calculated to be lower than a predetermined threshold.

12. The information processing apparatus according to claim 10, further comprising:
a reliability degree calculator that calculates a reliability degree of each of the text regions, wherein
the text region editor merges or splits text regions for which the reliability degree is calculated to be lower than a predetermined threshold such that a resulting merged or split text region has a reliability degree higher than the predetermined threshold.

13. The information processing apparatus according to claim 10, further comprising:
a text region extractor that generates text region information indicating (i) the original text, (ii) a coordinate, a height and a width of each of the text regions, and (iii) the image of the text included in each of the text regions.

14. An information processing method comprising:
displaying, on a display device of an information processing apparatus, image information, text regions, and original text in association with each other, the text regions being obtained by extracting regions including an image of text from the image information, the original text being obtained by performing character recognition on the text included in the text regions;
receiving an editing operation of the text regions displayed on the display device from a user; and
editing the text regions in accordance with the content of the editing operation received on the display device of the information processing apparatus, wherein,
in the displaying, merge boxes for selecting two or more of the text regions to be merged are displayed on the display device in association with the original text, and a merge button is further displayed, and
in the editing of the text regions,
  selecting of respective merge boxes for the two or more of the text regions or selecting of a portion of the displayed original text is received as part of the content of the received operation, and
  in response to the selecting of the respective merge boxes for the two or more of the text regions and in accordance with a merge instruction received on the display device by operation of the merge button, the two or more of the text regions displayed on the display device as separate text regions are merged together so as to be displayed on the display device as a single text region.

15. The information processing method according to claim 14, further comprising:
calculating a reliability degree of each of the text regions; and
merging text regions for which the reliability degree is calculated to be lower than a predetermined threshold.

16. The information processing method according to claim 14, further comprising:
calculating a reliability degree of each of the text regions; and
merging or splitting text regions for which the reliability degree is calculated to be lower than a predetermined threshold such that a resulting merged or split text region has a reliability degree higher than the predetermined threshold.

17. The information processing method according to claim 14, further comprising:
generating text region information indicating (i) the original text, (ii) a coordinate, a height and a width of each of the text regions, and (iii) the image of the text included in each of the text regions.

* * * * *